United States Patent Office 3,528,986
Patented Sept. 15, 1970

3,528,986
DISODIUM 4,4'-DISULPHOXYDIPHENYL-
(2-PYRIDYL)-METHANE
Gianfranco Pala, Milan, Italy, assignor to Istituto de
Angeli S.p.A., Milan, Italy, an Italian corporation
No Drawing. Filed Aug. 22, 1966, Ser. No. 573,873
Int. Cl. C07d 31/48
U.S. Cl. 260—294.8            1 Claim

ABSTRACT OF THE DISCLOSURE

The compound, disodium 4,4'-disulphoxydiphenyl-(2-pyridyl)-methane, useful as a laxative for humans.

---

It is known that the preparation of aliphatic monoesters from sulphuric acid is very easy, but that the preparation of aromatic monoesters, particularly from substituted phenols offers considerable difficulty (Lassar-Cohn: Arbeitsmethoden, IV edition, p. 290).

The object of the present invention is the provision of a new aromatic monoester of sulphuric acid, in which a diphenol corresponding to the following formula

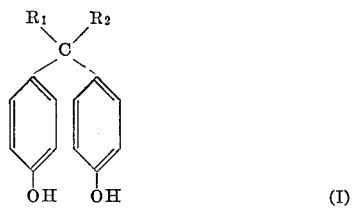

in which $R_1$ represents an hydrogen atom or an alkyl group and $R_2$ represents an alkyl group or a 2-pyridyl group, or $R_1$ and $R_2$ together with the carbon atom to which they are bonded, represent a phthalidic group

is treated under substantially anhydrous conditions with chlorosulphonic acid in the presence of an acid acceptor at a temperature comprised between 0° C. and ambient temperature, the mixture then being poured into water/ice, the acid acceptor then being eliminated by extraction of the mixture which has been rendered basic, the unreacted starting diphenol then being eliminated from the aqueous solution by extraction at a pH comprised between 7 and 9, and the salt of the new aromatic monoester being obtained by concentration to the dry state of the solution, at a low temperature and a reduced pressure, extraction of the salt of the aromatic monoester with an organic solvent and crystallisation; its chemical constitution is as follows

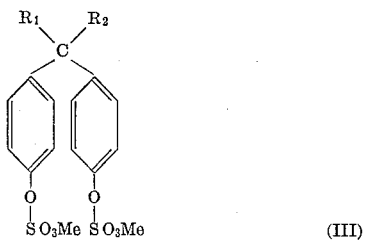

in which Me signifies an inorganic cation.

A further object of the present invention is the utilization of a salt of the new aromatic monoesters particularly of the non-toxic inorganic salts, as laxatives.

The new salt of the aromatic monoesters of sulphuric acid according to the present invention is produced by condensation of the corresponding phenols of the general Formula I under substantially anhydrous conditions with chlorosulphonic acid in the presence of an acid acceptor and preferably an inert solvent. As acid acceptors, it is advantageous to use tertiary organic bases such as pyridine, quinoline, dimethyl aniline. As solvents, it is possible to use to advantage chloroform, dioxane or an excess of tertiary organic base, preferably pyridine.

According to a particular favourable embodiment, the compounds of Formula I, dissolved in anhydrous pyridine are caused to react at a temperature comprised between 0° C. and ambient temperature with chlorosulphonic acid. After alkalinisation of the reaction mixture, the solution is extracted with a suitable solvent, for example ether, in order to eliminate the majority of the pyridine then, after the pH has been adjusted to 8 with 10% hydrochloric acid, the solution is again extracted with chloroform to remove any unreacted starting product. The aqueous solution is brought to the dried state at 40–45° C. at low pressure and the compound of Formula III is separated from the inorganic salts present in the residue by extraction with boiling ethanol. The said compounds are preferably isolated in the form of bisodic bihydrate salts which take the form of white solids readily soluble in water (the pH of the 1% aqueous solution is about 7–8), more or less soluble in ethanol and methanol and insoluble in ether and benzene.

The new aromatic monoester of sulphuric acid according to the present invention has a particularly important laxative action. This action has been studied experimentally on the rat and in some cases also on the mouse. It is important to note that the experiments on the mouse are particularly important due to the animal's resistance to experiments with substances of laxative activity. It is now known that compounds of the general formula:

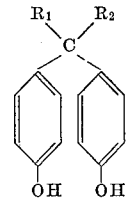

(in which $R_1$ and $R_2$ are groups as defined above) have a laxative activity and that such compounds can give rise to phenomena of intolerance such as for example the advent of abdominal pains and, in particularly sensitive subjects, abdominal colic. It is also known that the esterification of the phenol hydroxyl groups of the said compounds with organic acids, generally acetic acid, which improve the tolerance characteristics, substantially reduce the activity of such compounds except in rare cases in which it has however been found that the acetyl derivative is partly transformed by the organism into the corresponding free phenol, restoring the conditions which favour the aforesaid side-effects.

It has been found that compounds of Formula III exhibit a greater laxative action and generally less toxicity than the corresponding phenols of Formula I and the relative acetyl derivatives and that the increased laxative action of the said compounds is closely linked with the presence of the esterifying sulphuric group.

Thus, disodium (4,4'-disulphoxydiphenyl)-(2-pyridyl)-methane has shown that it has a laxative action of particular value combined with an irrelevant toxicity. The approxiamte $LD_{50}$ of the rat is 5000 mg./kg. per os, while the approximate $LD_{50}$ in the rabbit, intravenously, is 400 mg./kg.

The laxative action of this compound has been studied by the test described by L. Schmidt and E. Seeger, Arzneimittel Forsch. 12.1152 (1962) on the rat, at a dose of 10 mg./kg. per os which rendered 100% of the animals diarrhoic and in the mouse at a dose of 2000 mg./kg. per os, which rendered 50% of the animals diarrhoic.

A preliminary clinical experimentation realized in 250 cases comprising persons of each age, old people, grown-ups and children, has confirmed the good tolerance of the product of the present invention and its efficiency in respect to humans.

The compound is fully eliminated in the faeces, while no trace of it is found in the urine. It is particularly important to note that the said compound is not decomposed in the organism but is eliminated unaltered, which shows that its activity is a peculiar characteristic of the product per se. Its activity and tolerance have been confirmed by results of a preliminary clinical experimentation.

Other compounds of interest by virtue of their laxative action are the disodium (4,4'-disulphoxydiphenyl)-dimethyl methane and disodium (4,4'-disulphoxydiphenyl)-phthalide.

The results of the Schmidt and Seeger test on the rat show in fact that, at the dose of 400 mg./kg. per os, the said compounds render respectively 30% and 50% of the animals treated diarrhoic.

In accordance with the use of the product of the present invention, the compound of Formula III may be made up with suitable excipients or vehicles in pharmaceutical compositions for oral or rectal administration. Compositions which are particularly preferred for oral administration are those in liquid form for example drops and syrups. The vehicle used is water with adjunction if desired of dulcifying, aromatizing and preservative agents.

In the liquid compositions for oral use, the compounds are used at the following concentrations:

| | Drops, percent | Syrups, percent |
|---|---|---|
| Disodium-(4,4'-disulphoxydiphenyl)-(2-pyridyl)-methane | 0.5–1 | 0.1–0.25 |
| Disodium (4,4'-disulphoxydiphenyl)-phthalide | 10–20 | 2–5 |
| Disodium (4,4'-disulphoxydiphenyl)-dimethyl methane. | | |

The solid compositions for oral use and the compositions for rectal administration are preferably made up in forms containing the unit dose. Compositions for oral use in the form of a unit dose comprise for example tablets, capsules and coated tablets. Each unit dose has stipulated above contains, according to the compounds of Formula III which are used, the following doses

| | Oral use (mg.) | Rectal use (mg.) |
|---|---|---|
| Disodium (4,4'-disulphoxydiphenyl)-(2-pyridyl)-methane | 1–10 | 1.5–15 |
| Disodium (4,4'-disulphoxydiphenyl)-phthalide | 20–200 | 30–300 |
| Disodium (4,4'-disulphoxydiphenyl)-dimethyl methane. | | |

The following examples are given purely in order to illustrate the invention more clearly but do not limit its scope which is defined by the appropriate claims.

EXAMPLE 1

In half-an-hour, 102 g. chlorosulphonic acid are added to a solution of 100 g. 4,4'-dihydroxyldiphenyl (2-pyridyl)-methane in 750 ml. of anhydrous pyridine, the temperature being maintained at between 0° and 5° C. Towards the end of the addition of acid, a precipitate is formed which is slowly redissolved during subsequent agitation.

Upon completion of the addition, the mixture is agitated for 7 hours at ambient temperature. The solution is then poured into 3 litres of water/ice obtaining a clear solution of dark yellow colour which is rendered alkaline upon phenolphthalein with 30% NaOH and extracted with sulphuric ether to eliminate the majority of the pyridine. The mixture is filtered with active charcoal, the pH adjusted to 8 with hydrochloric acid 1:1 and extracted with chloroform to remove the 4,4'-dihydroxydiphenyl-(2-pyridyl)-methane which has not reacted. The aqueous solution is then concentrated at dryness at an outside temperature of 40–45° C. and at low pressure. The residue, obtained by drying in a vacuum at 40–45° C. is triturated in a mortar with sulphuric ether and, after filtration, is extracted with 3400 ml. boiling absolute ethanol. The ethanol extract is separated from the undissolved part by filtration, cooled and the product which crystallises by cooling is filtered and dried at 40° C. in a vacuum. In that manner the disodium (4,4-disulphoxydiphenyl) - (2 - pyridyl)-methane bi-hydrate is obtained, which takes the form of a white solid.

Analyses (on a sample previously dried at 105° C.) for $C_{18}H_{13}O_8NS_2Na_2$ calculated (percent): C, 44.90; H, 2.72; N, 2.91; S, 13.31; Na, 9.55. Found (percent): C, 44.65; H, 2.80; N, 2.98; S, 12.90; Na, 9.22.

EXAMPLE 2

In half-an-hour, 20.9 g. chlorosulphonic acid are added to a solution of 20 g. 4,4'-dioxydiphenyldimethylmethane in 150 ml. anhydrous pyridine, the temperature being maintained at between 0° and 5° C. Towards the end of the addition of the chlorosulphonic acid, a precipitate is formed which is slowly redissolved during the subsequent agitation.

On completion of the addition, the mixture is stirred for another 7 hours at ambient temperature. The solution is then poured into 600 ml. of water/ice, obtaining a clear solution of dark yellow colour which is rendered alkaline upon phenolphthalein with 30% NaOH and extracted with sulphuric ether to remove the greater part of the pyridine. It is filtered through activated charcoal, the pH is adjusted to 8 with 1:1 hydrochloric acid and the mixture extracted with chloroform to remove unreacted 4,4'-di-hydroxydiphenyl-dimethyl methane. The aqueous solution is concentrated at dryness at an outside temperature of 40–45° C. and at low pressure. The residue obtained by drying in a vacuum at 40–45° C. is triturated in a mortar with sulphuric ether and, after filtration, extracted with 860 ml. of boiling absolute ethanol. The ethanol extract is separated from the undissolved part by filtration, brought to a small volume and the solid precipitated is filtered. The extractions with boiling ethanol are repeated until complete separation of the inorganic salts has occurred. Finally, the alcoholic solution is concentrated and the solid which is separated is filtered and dried in a vacuum at 40–45° C.

Analyses (on a sample previously dried at 105° C.): for $C_{15}H_{14}O_8S_2Na_2$ calculated (percent): C, 41.66; H, 3.26; S, 14.83; Na, 10.64. Found (percent): C, 41.41; H, 3.51; S, 13.88; Na, 10.41.

EXAMPLE 3

In half-an-hour, 15 g. chlorosulphonic acid are added to a solution of 20 g. 4,4'-dioxydiphenyl-phthalide in 150 ml. anhydrous pyridine, the temperature being maintained at between 0 and 5° C. Towards the end of the addition of the chlorosulphonic acid, a precipitate is formed which is slowly redissolved during the subsequent stirring.

Upon completion of the addition, the mixture is stirred for another 7 hours at ambient temperature. The solution is then paured into 600 ml. of water/ice, producing a clear solution of dark yellow colour which is rendered alkaline upon phenolphthalein with 30% NaOH and extracted with sulphuric ether to remove the greater part of the pyridine. It is filtered with activated charcoal, the pH is adjusted to 8 with 1:1 hydrochloric acid and the mixture extracted with chloroform to remove the unreacted 4,4'-dioxydiphenyl-phthalide. The aqueous solution is then concentrated at dryness at an outside temperature of 40–45° C. and at low pressure. The residue, after being dried in a vacuum at 40–45° C. is triturated in a mortar with sulphuric ether and, after filtration, extracted with 350 ml. of boiling absolute ethanol. The ethanol extract is separated from the undissolved part by filtration, cooled and the product which crystallises by cooling is filtered and dried at 40° C. in a vacuum. In that manner the disodium (4,4′-disulphoxydiphenyl)-phthalide bihydrate is obtained, which takes the form of a white solid.

*Analyses* (on a sample previously dried at 105° C.): for $C_{20}H_{12}O_{10}S_2Na_2$ calculated (percent): C, 45.97; H, 2.32; S, 12.27; Na, 8.80. Found (percent): C, 46.40; H, 2.56; S, 11.50; Na, 8.77.

EXAMPLE 4

The ingredients for preparing 1 litre of drops are the following:

|  | G. |
|---|---|
| Disodium (4,4′-disulphoxydiphenyl)-(2-pyridyl)-methane | 7.5 |
| Methyl p-oxybenzoate | 2.0 |

35% sorbitol syrup sufficient to make the mixture up to 1 litre.

10 drops (approx. 0.7 ml.) contain approx. 5 mg. active substance.

EXAMPLE 5

The ingredients for making 1 litre of syrup are the following:

|  | G. |
|---|---|
| Disodium (4,4′-disulphoxydiphenyl)-phthalide | 33.3 |
| Methyl p-oxybenzoate | 2 |

50% sugar syrup and aromatic additive to make up to 1 litre.

One teaspoonful (approx. 3 ml.) contains approx. 100 mg. of active substance.

EXAMPLE 6

The ingredients for producing 1000 coated tablets are the following:

|  | G. |
|---|---|
| Disodium (4,4′-disulphoxydiphenyl)-(2-pyridyl)-methane | 5 |
| Amide | 10 |
| Magnesium stearate | 0.5 |
| Lactose | 4.5 |
| Sugar and colouring to make up to | 75 |

Each coated tablet contains 5 mg. of active substance.

EXAMPLE 7

The ingredients for producing 1000 suppositories are the following:

|  | G. |
|---|---|
| Disodium (4,4′-disulphoxydiphenyl)-(2-pyridyl)-methane | 10 |
| Semi-synthetic saturated glycerides to make up to | 1000 |

Each suppository contains 10 mg. of active substance.

I claim:
1. The disodium salt of 4,4′-disulphoxydiphenyl-(2-pyridyl)-methane.

References Cited

UNITED STATES PATENTS

| 2,468,982 | 5/1949 | Jansen | 260—619 |
| 2,764,590 | 9/1956 | Kottler et al. | 260—295 |
| 2,767,196 | 10/1956 | Salkin | 167—56 X |
| 2,871,242 | 1/1959 | Seeger et al. | 260—295 |
| 3,140,229 | 7/1964 | Schultz | 167—56 |

OTHER REFERENCES

Boyland et al.: J. Chem. Soc., London, 1958, pp. 532–534.

Raudsepp et al.: Chem. Abstracts, vol. 60, par. 4807, March 1964.

ALAN L. ROTMAN, Primary Examiner

U.S. Cl. X.R.

260—343.4, 457; 424—263, 285, 303